(12) United States Patent
Yada et al.

(10) Patent No.: US 8,576,434 B2
(45) Date of Patent: Nov. 5, 2013

(54) PRINTER

(75) Inventors: Yuki Yada, Kuwana (JP); Yohei Maekawa, Nagoya (JP); Takeshi Miyake, Nagoya (JP); Munehisa Matsuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 97 days.

(21) Appl. No.: 13/361,768

(22) Filed: Jan. 30, 2012

(65) Prior Publication Data

US 2012/0229844 A1 Sep. 13, 2012

(30) Foreign Application Priority Data

Mar. 11, 2011 (JP) ................................. 2011-054432

(51) Int. Cl.
 *G06F 15/00* (2006.01)
(52) U.S. Cl.
 USPC ......................................................... 358/1.15
(58) Field of Classification Search
 USPC ......................................................... 358/1.15
 See application file for complete search history.

(56) References Cited

U.S. PATENT DOCUMENTS

| | | |
|---|---|---|
| 2002/0024686 A1 | 2/2002 | Uchiyama et al. |
| 2003/0225894 A1 | 12/2003 | Ito |
| 2006/0028679 A1 | 2/2006 | Uchiyama et al. |
| 2006/0028680 A1 | 2/2006 | Uchiyama et al. |
| 2008/0155152 A1* | 6/2008 | Keeney et al. ................ 710/220 |

FOREIGN PATENT DOCUMENTS

| | | |
|---|---|---|
| JP | 2002-073462 A | 3/2002 |
| JP | 2004-209961 A | 7/2004 |

* cited by examiner

*Primary Examiner* — Saeid Ebrahimi Dehkordy
(74) *Attorney, Agent, or Firm* — Baker Botts L.L.P.

(57) ABSTRACT

A printer may judge whether a first type of communication with the print mediation server. The printer may execute the first type of communication and receive a predetermined notification in a case where it is judged that the first type of communication is executable. The printer may, (A) execute, when the predetermined notification is received a second type of communication so as to acquire specific address information, in the case where being judged that the first type of communication is executable and (B) execute, even if the predetermined notification is not received, the second type of communication at a predetermined timing so as to acquire the specific address information in a case where it is judged that the first type of communication is not executable. The printer may acquire the specific print data and print an image represented by the specific print data.

11 Claims, 5 Drawing Sheets

One Example of Job Information id:12345　　　　　　　　　　　　　　　← File Format of PD1
printerid:6789
contenttype:application/pdf ←
fileurl:https://www.example.com/aaa/bbb ← — URL of PD1
⋮　　　　　　　　　　　　　　　　　　　}- J1
status:QUEUED
⋮ id:23451
printerid:6789
contenttype:application/doc
fileurl:https://www.example.com/eee/fff
⋮　　　　　　　　　　　　　　　　　　　}- J2
status:DONE
⋮

PRINTER

CROSS-REFERENCE TO RELATED APPLICATIONS

This application claims priority to Japanese Patent Application No. 2011-054432, filed on Mar. 11, 2011, the contents of which are hereby incorporated by reference into the present application.

TECHNICAL FIELD

The technique disclosed in the present specification relates to a printer configured to be connected with a print mediation server through the Internet.

DESCRIPTION OF THE RELATED ART

With a conventional system, a user inputs an ID of a document that is a print object into a terminal device. In this case, the terminal device transmits the ID to a print request administration server. The print request administration server transmits print request data including the ID to a facsimile server. In this case, the facsimile server acquires print data corresponding to the ID and transmits the print data to a printer. As a result, the printer executes printing according to the print data.

SUMMARY

The conventional technique is based on the premise that the facsimile server is capable of acquiring the print request data from the print request administration server. However, for example, there may be an environment in which communication of the print request data from the print request administration server to the facsimile server is not executable. In this case, the printer cannot acquire the print data to execute printing. The present specification discloses a technique that a printer may acquire print data to execute printing in an appropriate manner.

One aspect of techniques disclosed in the present specification is a printer. The printer may comprise a processor. The processor may operate as a judging unit, a first communication executing unit, a second communication executing unit, a data acquiring unit, and a print control unit. The judging unit may be configured to judge whether a first type of communication using a first port number is executable or not with the print mediation server. The first communication executing unit may be configured to execute the first type of communication so as to receive a predetermined notification from the print mediation sewer in a case where it is judged that the first type of communication is executable, wherein the predetermined notification is a notification to be sent to the printer by the print mediation server when the print mediation server has stored specific print data in a storage unit according to an instruction from a terminal device. The second communication executing unit may be configured to (A) execute, when the predetermined notification is received, a second type of communication using a second port number different from the first port number with the print mediation server so as to acquire specific address information indicating a storage address of the specific print data in the storage unit from the print mediation server, in the case where it is judged that the first type of communication is executable, and (B) execute, even if the predetermined notification is not received, the second type of communication at a predetermined timing so as to acquire the specific address information from the print mediation server, in a case where it is judged that the first type of communication is not executable. The data acquiring unit may be configured to acquire the specific print data from the storage unit by using the specific address information. The print control unit may be configured to cause a print executing unit to execute printing of an image represented by the specific print data.

Moreover, a method for realizing the printer is also novel and useful. In addition, a computer program for realizing the printer and a non-transitory computer readable storage medium that stores the computer program are also novel and useful.

EMBODIMENT (System Configuration)

Figure 1:
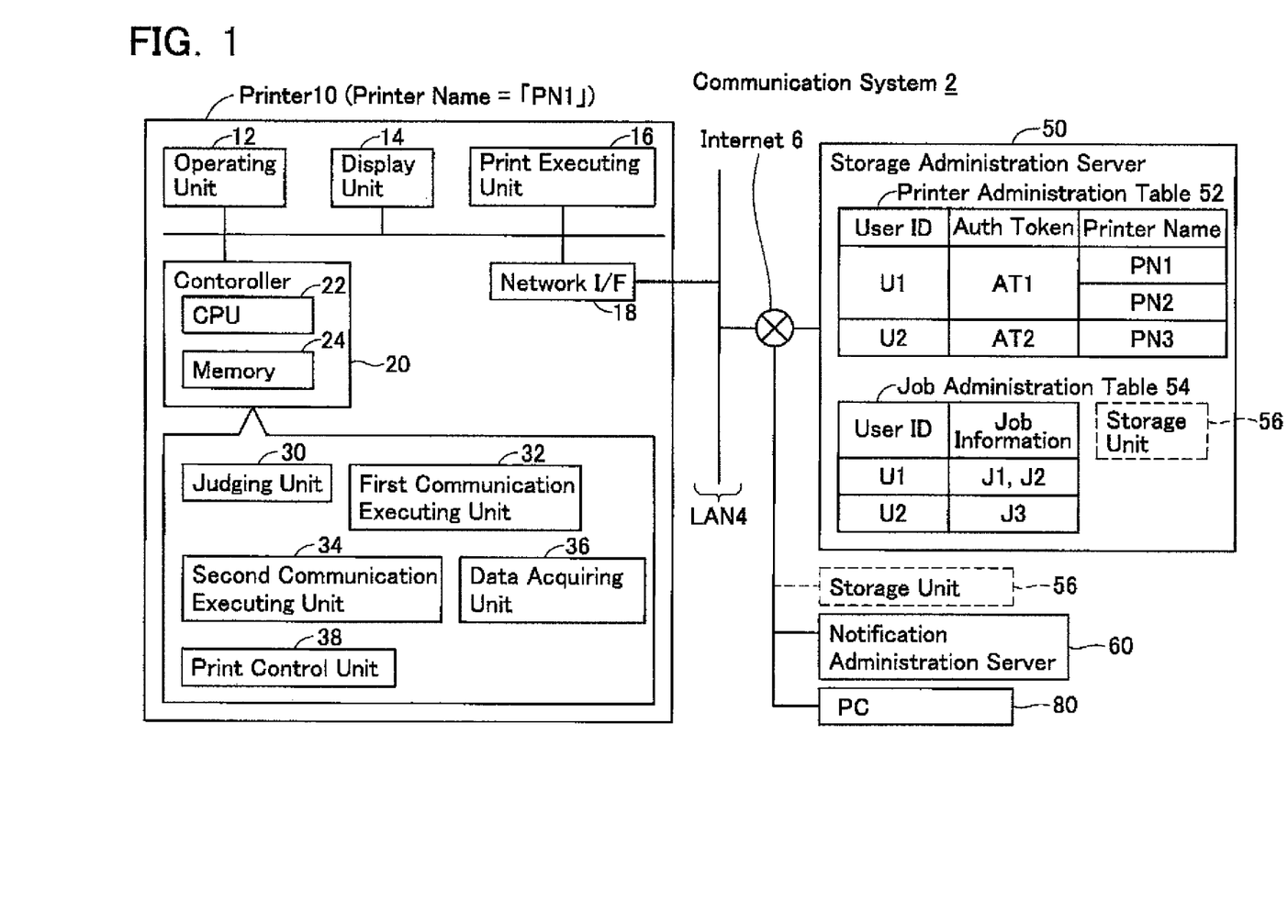
FIG. 1 shows an example of a configuration of a communication system.

As shown in FIG. 1, a communication system 2 comprises a printer 10 (a peripheral of a PC 80), a storage administration server 50, a notification administration server 60, and the PC 80. The respective devices 10 and 50 to 80 are separately configured. The printer 10 is connected to the Internet 6 through a LAN 4. The respective devices 50 to 80 are connected to the Internet 6. Therefore, the printer 10 is connected so as to be capable of communicating with the respective devices 50 to 80 through the Internet 6. Moreover, in a modification, the PC 80 may be connected to the LAN 4. In this case, the printer 10 is connected so as to be capable of communicating with the PC 80 through the LAN 4 instead of through the Internet 6.

(Configuration of Printer 10)

The printer 10 comprises an operating unit 12, a display unit 14, a print executing unit 16, a network interface 18, and a controller 20. The respective units 12 to 20 are connected to a bus line (reference numeral omitted). The operating unit 12 comprises a plurality of keys. By operating the operating unit 12, a user can input various instructions to the printer 10. The display unit 14 is a display for displaying various types of information. The print executing unit 16 comprises a printing mechanism adopting an inkjet head system, a laser system, or the like, and executes printing in accordance with an instruction from the controller 20. The network interface 18 is connected to the LAN 4.

The controller 20 comprises a CPU 22 and a memory 24. The CPU 22 executes various processes in accordance with a program stored in the memory 24. Respective functions of a judging unit 30, a first communication executing unit 32, a second communication executing unit 34, a data acquiring unit 36, and a print control unit 38 are realized as a result of the CPU 22 executing processes in accordance with the program.

(Configuration of Storage Administration Server 50 and Notification Administration Server 60)

The storage administration server 50 and the notification administration server 60 are servers for mediating printing (in other words, print mediation servers) by the printer 10. The respective servers 50 and 60 are not servers provided by a vendor of the printer 10 but are servers provided by a company that provides a cloud printing service (hereinafter referred to as a "provider"). However, in a modification, the respective servers 50 and 60 may be servers provided by the vendor of the printer 10. In addition, while the servers 50 and 60 are configured separately in the present embodiment, the servers 50 and 60 may be integrally configured in a modification.

The storage administration server 50 stores data that is a print object (hereinafter, referred to as "print data") in a storage unit 56 in accordance with an instruction from the PC 80. Moreover, the storage unit 56 may be provided inside the storage administration server 50 or may be provided outside the storage administration server 50. In the latter case, the storage unit 56 may be rephrased as a "storage server".

The storage administration server 50 stores a printer administration table 52. In the printer administration table 52, a user ID, an AuthToken, and a printer name are associated with each other. The user ID is an ID issued by the provider to a user desiring to use the cloud printing service. The AuthToken is identification information assigned to the user when the user uses the user ID to log into the storage administration server 50. Moreover, since the user ID and the AuthToken are associated with each other in the storage administration server 50, the AuthToken may be described as being information related to the user ID. The printer name is a node name of a printer (for example, a name specified by the user of the printer). For example, the printer name of the printer 10 is "PN1".

The storage administration server 50 further stores a job administration table 54. In the job administration table 54, a user ID and job information are associated with each other. The user ID is the same as the user ID used in the printer administration table 52. The job information will be described later in detail with reference to FIG. 3.

Moreover, when storing print data in the storage unit 56 in accordance with an instruction from a user having a specific user ID (for example, "U1") (that is, an instruction from a terminal device used by the user having the specific user ID), the storage administration server 50 provides a storage notification including the specific user ID to the notification administration server 60.

In a case where the notification administration server 60 acquires the storage notification including the specific user ID from the storage administration server 50, the notification administration server 60 transmits a predetermined notification to a printer (for example, the printer 10) for which an authentication using the specific user ID has succeeded. This will be described in detail later.

(Processes Executed by Respective Devices)

Next, contents of processes executed by respective devices will be described with reference to FIG. 2. The printer 10 stores a web server program and is capable of functioning as a web server. In addition, the storage administration server 50 also stores a web server program and is also capable of functioning as the web server. On the other hand, the PC 80 stores a web browser program and is capable of functioning as a web client.

(Process Related to Authentication)

An outline of processes executed by the respective devices will now be described. Specific processes executed by the printer 10 will be described in detail later with reference to FIGS. 4 and 5. In a case where the user of the PC 80 desires to use the cloud printing service, the user performs an operation for accessing the web server of the printer 10 on an operating unit (not shown; for example, a keyboard or a mouse) of the PC 80. In this case, the PC 80 accesses the web server of the printer 10 by using a web browser. The web server of the printer 10 provides the PC 80 with screen data representing a login screen for inputting a user ID and a password. As a result, the login screen is displayed on a display unit (not shown) of the PC 80. The user performs an operation for inputting login information including a user ID "U1" and a password to the operating unit of the PC 80 while viewing the login screen. In this case, the PC 80 provides the login information to the printer 10.

In a case where the login information is acquired from the PC 80, the second communication executing unit 34 (refer to FIG. 1) of the printer 10 transmits the login information to the storage administration server 50. Moreover, an IP address and a port number (in the present embodiment, port number 443) of the storage administration server 50 are stored in advance in the memory 24 of the printer 10, and the second communication executing unit 34 transmits the login information to the IP address and the port number "443" as a destination. Furthermore, normally, the port number "443" is a port number used in HTTPS (HyperText Transfer Protocol over Secure socket layer) communication.

Although not shown, the storage administration server 50 stores a user administration table, in which for each of a plurality of user IDs, the user ID and the password are associated with one another. In a case where the login information is received from the printer 10, the storage administration server 50 judges whether or not the user ID and the password included in the login information are included in the user administration table (that is, the storage administration server 50 executes the authentication). In a case where the user ID and the password are included in the user administration table, the storage administration server 50 transmits success information indicating that the authentication has succeeded to the printer 10. In this case, the storage administration server 50 further creates an AuthToken "AT1" and transmits the AuthToken "AT1" to the printer 10. Moreover, the storage administration server 50 may transmit the same AuthToken to the printer 10 each time a login is made by the printer 10 (each time authentication succeeds) or may transmit a different AuthToken to the printer 10 each time a login is made by the printer 10 (each time authentication succeeds).

As a result, the second communication executing unit 34 receives the success information and the AuthToken "AT1" from the storage administration server 50. Moreover, in a case where the success information is received from the storage administration server 50, the second communication executing unit 34 provides the printer name "PN1" of the printer 10 to the storage administration server 50. In this case, the storage administration server 50 registers an association of the user name "U1", the AuthToken "AT1", and the printer name "PN1" to the printer administration table 52.

Next, the judging unit 30 (refer to FIG. 1) of the printer 10 attempts to establish a TCP communication session between the printer 10 and the notification administration server 60. Specifically, the judging unit 30 first transmits a TCP SYN signal to the notification administration server 60. Moreover, an IP address and a port number (in the present embodiment, port number 5222) of the notification administration server 60 are stored in advance in the memory 24 of the printer 10, and the judging unit 30 transmits the SYN signal to the IP address and the port number "5222" as a destination. Upon receiving a SYN/ACK signal from the notification administration server 60, the judging unit 30 transmits an ACK signal to the notification administration server 60. Accordingly, the TCP communication session is established between the printer 10 and the notification administration server 60.

Moreover, the communication of the SYN signal, the SYN/ACK signal, and the ACK signal may also be referred to as a "TCP negotiation".

Next, in a case where the TCP communication session is established, the first communication executing unit 32 (refer to FIG. 1) of the printer 10 opens an XMPP (eXtensible Messaging and Presence Protocol) stream by using the TCP communication session. When opening the stream, the first communication executing unit 32 transmits the login information to the notification administration server 60. Although not shown, the notification administration server 60 stores a user administration table in the same manner as the storage administration server 50. In a case where the login information is received from the printer 10, the notification administration server 60 executes a authentication similar to that executed by the storage administration server 50 and transmits success information indicating that the authentication has succeeded to the printer 10.

Moreover, normally, a status in which the communication session is being established, which in other words, a status in which the XMPP stream is being opened is maintained between the printer 10 and the notification administration server 60 until power of the printer 10 is turned off. Hereinafter, the communication session between the printer 10 and the notification administration server 60 will be referred to as a "continuous communication session". Moreover, normally, the TCP communication session used in order to open the XMPP stream is closed before opening the XMPP stream. This TCP communication session may either be maintained or not be maintained (may be closed). That is, the "continuous communication session" does not mean that the TCP communication session is to be maintained but means that a status in which the XMPP stream is being opened is to be maintained. On the other hand, while a status in which the communication session is being established is not maintained between the printer 10 and the storage administration server 50, a communication session (in other words, a TCP communication session) is temporarily established between the printer 10 and the storage administration server 50 when job information and the like (to be described later) are communicated between the printer 10 and the storage administration server 50. The communication session between the printer 10 and the storage administration server 50 will be referred to as a "temporary communication session".

(Print Instruction from PC 80 to Storage Administration Server 50)

In a ease where the user of the PC 80 desires to cause the printer 10 to perform printing, the user performs an operation for accessing the web server of the storage administration server 50 on the operating unit of the PC 80. In this case, the PC 80 accesses the web server of the storage administration server 50 by using the web browser. In the same manner as the case with the web server of the printer 10, screen data representing a login screen is provided to the PC 80 from the storage administration server 50 and the login screen is displayed on the display unit of the PC 80. The user performs an operation for inputting the login information including the user ID "U1" and the password to the operating unit of the PC 80 while viewing the login screen. In this case, the PC 80 provides the login information to the storage administration server 50. Moreover, in the present embodiment, while a terminal device that transmits the login information to the printer 10 and a terminal device that transmits the login information to the storage administration server 50 are the same (that is, the PC 80), the former terminal device and the latter terminal device may differ from each other.

In a case where the login information is acquired from the PC 80, the storage administration server 50 executes the same authentication as described above. Next, in a case where the authentication succeeds, the storage administration server 50 creates screen data representing a print setting screen. Specifically, the storage administration server 50 first identifies printer names "PN1" and "PN2" associated with the user ID "U1" included in the login information front the printer administration table 52, and creates screen data representing a print setting screen including the printer names "PN1" and "PN2". The storage administration server 50 then provides the screen data to the PC 80. As a result, the print setting screen is displayed on the display unit of the PC 80. The user selects the printer name "PN1" of the printer 10 to execute the printing from the printer names "PN1" and "PN2" while viewing the print setting screen. In this case, the PC 80 provides selection result information including the printer name "PN1" to the storage administration server 50.

Furthermore, for example, the user of the PC 80 can select a file stored in the PC 80 as a print object or select a file existing outside of the PC 80 (for example, a file stored in a server on the Internet) as the print object. In the former case, the PC 80 provides print data PD1 to the storage administration server 50. In the latter case, for example, the PC 80 may acquire the print data PD1 from the outside of the PC 80 and provide the print data PD1 to the storage administration server 50, or may instruct a server storing the print data PD1 to provide the print data PD1 to the storage administration server 50. Moreover, in a modification, the user of the PC 80 may select a file stored in the storage administration server 50 as the print object.

As described above, the storage administration server 50 acquires the printer name "PN1" and the print data PD1. In this case, the storage administration server 50 executes a storage process (S10). That is, the storage administration server 50 executes the storage process in accordance with an instruction from the PC 80.

(Contents of Storage Process: S10)

In the storage process, the storage administration server 50 stores the print data PD1 in the storage unit 56 (refer to FIG. 1). In the storage process, the storage administration server 50 further registers an association of the user ID "U1" included in the login information acquired from the PC 80 and job information J1 corresponding to the print data PD1 newly stored in the storage unit 56 to the job administration table 54. Moreover, in the job administration table 54, a plurality of job information may potentially be registered in association with a single user ID. For example, as shown in FIG. 1, an association of the user ID "U1" and the plurality of job information J1 and J2 is registered to the job administration table 54. For example, the job information J2 is information registered to the job administration table 54 according to an instruction from the PC 80 or another PC before registration of the job information J1 to the job administration table 54.

Figure 3:
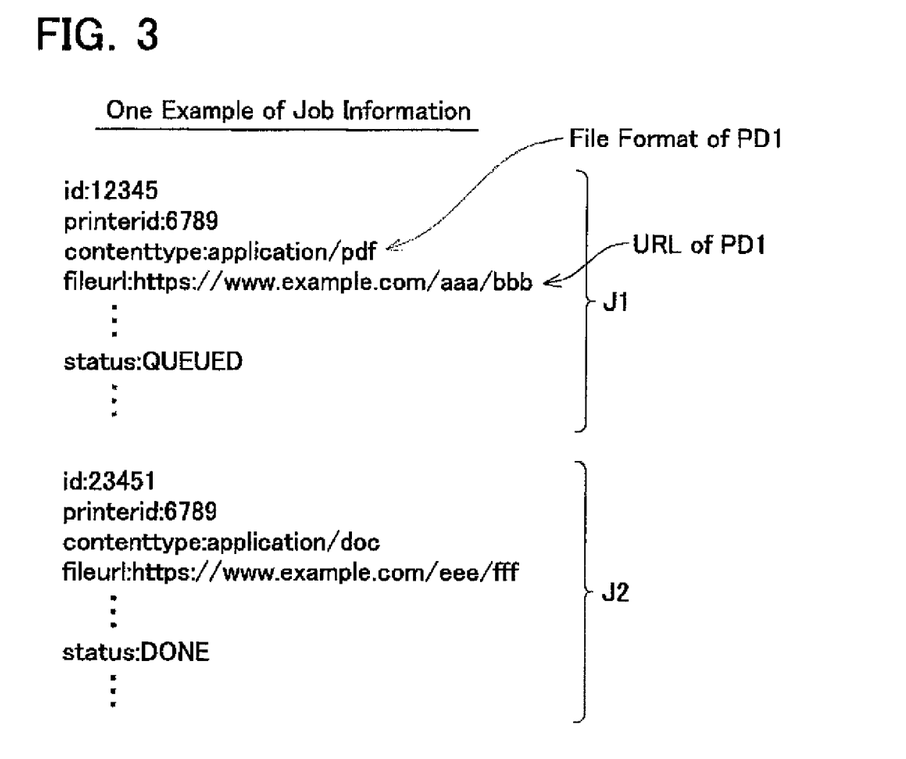
FIG. 3 shows an example of job information.

As shown in FIG. 3, the job information J1 includes a job ID "12345", a printer ID "6789", a file format "PDF" of the print data PD1, a URL of the print data PD1 (a URL in the storage unit 56), and a status "QUEUED".

The job ID is an ID for identifying an individual print job (that is, an ID for identifying individual print data stored in the storage unit 56). The printer ID is an ID for identifying a printer. Although not shown, the storage administration server 50 stores an association of the printer name and the printer ID. Therefore, once the printer name "PN1" of the printer 10 is acquired from the PC 80, the storage administration server 50 is capable of identifying the printer ID "6789" of the printer 10. In addition, the storage administration server 50 is capable of identifying a file format of the print data PD1 based on an extension of the file name of the print data PD1. The status "QUEUED" indicates that the print data PD1 is not yet acquired by the printer 10 (a print process in accordance with the print data PD1 is not yet executed).

The job information J2 has the same configuration as the job information J1. Moreover, the job information J2 includes a status "DONE". The status "DONE" indicates that the print process in accordance with the print data PD1 has already been executed by the printer 10. Furthermore, "ERROR" is provided as another status. The status "ERROR" indicates that although the print data PD1 has been acquired by the printer 10, an error (for example, a paper jam, out of paper, or out of toner) has occurred in the print process in accordance with the print data PD 1.

Figure 2:
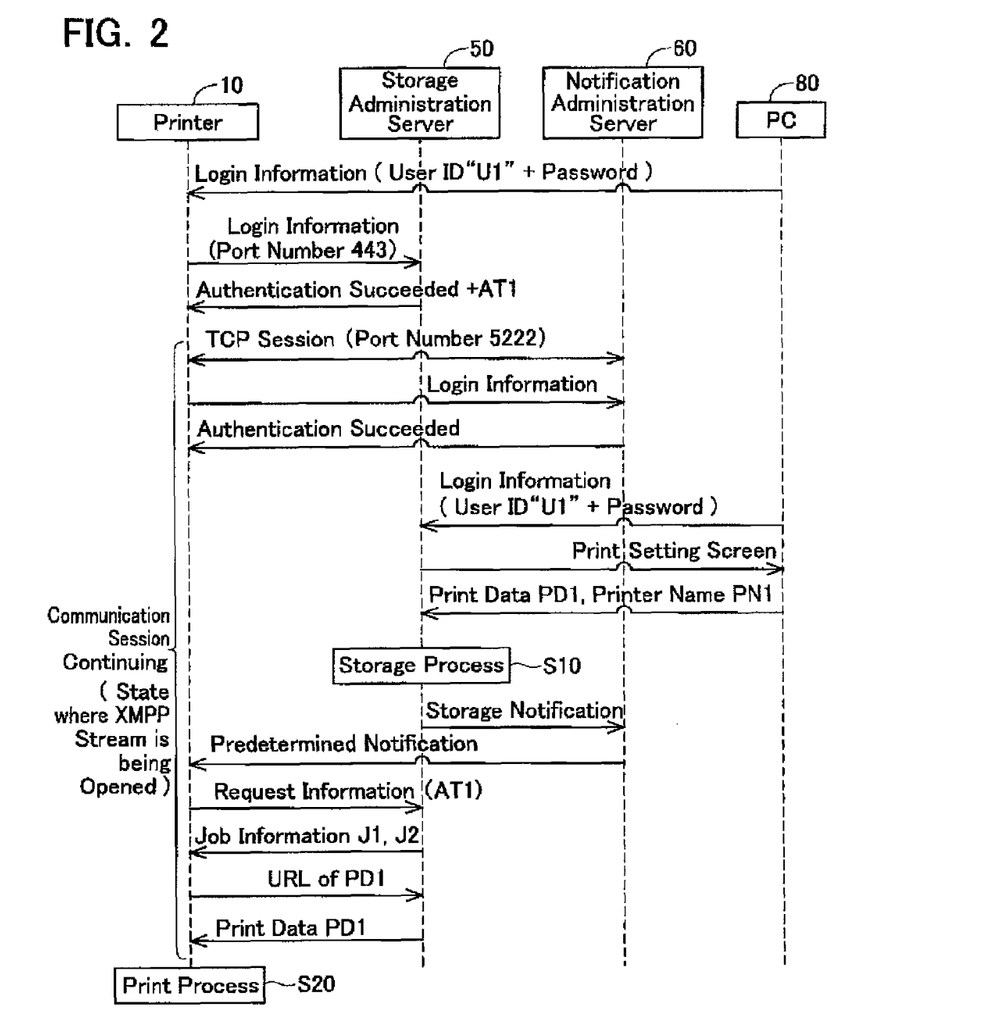
FIG. 2 shows a sequence diagram of an example of communication executed among respective devices.

As shown in FIG. 2, once the storage process (S10) is concluded, the storage administration sewer 50 provides a storage notification including the user ID "U1" to the notification administration server 60. Therefore, by acquiring the storage notification, the notification administration server 60 is able to know that the storage process has been executed according to the instruction from the user having the user ID "U1". In this case, the notification administration server 60 transmits the predetermined notification to the printer 10 for which the authentication of the login information including the user ID "U1" had succeeded. As above mentioned, the continuous communication session is being established between the notification administration server 60 and the printer 10. The notification administration server 60 transmits the predetermined notification to the printer 10 by using the continuous communication session. Moreover, the predetermined notification may also be referred to as an "XMPP notification".

(Respective Processes Subsequent to Storage Notification)

The first communication executing unit 32 of the printer 10 receives the predetermined notification from the notification administration server 60 by the communication using the continuous communication session, which in other words, communication using the port number "5222". In this case, the second communication executing unit 34 establishes the temporary communication session between the printer 10 and the storage administration server 50 by using the port number "443". The second communication executing unit 34 provides request information including the AuthToken "AT1." to the storage administration server 50 by the communication using the temporary communication session, which in other words, communication using the port number "443". Moreover, the AuthToken "AT1" is the information acquired upon the login to the storage administration server 50.

The storage administration server 50 identifies the user ID "U1" associated with the AuthToken "AT1" included in the request information from the printer administration table 52, then identifies the job information J1 and J2 associated with the user ID "U1" from the job administration table 54, and transmits the job information J1 and J2 to the printer 10. As a result, the second communication executing unit 34 acquires the job information J1 and J2 by the communication using the temporary communication session. As shown, in the present embodiment, since the second communication executing unit 34 provides the AuthToken "AT1" related to the user ID "U1" to the storage administration server 50, the second communication executing unit 34 is capable of appropriately acquiring the job information J1 and J2. Moreover, the job information J1 and J2 may also be referred to as "Fetch information".

Next, the data acquiring unit 36 (refer to FIG. 1) of the printer 10 identifies the job information J1 including the status "QUEUED" from the plurality of job information J1 and J2. The data acquiring unit 36 then identifies a URL of the print data PD1 from the job information J1 and acquires the print data PD1 from the storage unit 56 by using the URL. Specifically, the data acquiring unit 36 transmits a data acquisition request to the URL of the print data PD1 as a destination. As a result, in response to the data acquisition request, the storage unit 56 transmits the print data PD1 to the printer 10. Accordingly, the data acquiring unit 36 is capable of acquiring the print data PD1. Moreover, in an example shown in FIG. 1, the storage unit 56 is provided inside the storage administration server 50 and the data acquiring unit 36 acquires the print data PD1 from the storage administration server 50. However, as above mentioned, the storage unit 56 may alternatively be provided outside the storage administration server 50. In this case, the data acquiring unit 36 acquires the print data PD1 from the storage unit 56 outside the storage administration server 50.

Next, in S20, the print control unit 38 of the printer 10 causes the print executing unit 16 to execute printing of an image represented by the print data PD1. Specifically, the print control unit 38 provides a drive signal (for example, a drive signal to be provided to a piezoelectric element for discharging ink or a drive signal provided to a laser source for forming an electrostatic latent image on a photoreceptor) in accordance with the print data PD1 to the print executing unit 16. Accordingly, the print executing unit 16 is capable of printing an image represented by the print data PD1 on a printing medium, and the user is capable of obtaining the printing medium.

On the other hand, the data acquiring unit 36 of the printer 10 does not acquire print data based on the job information J2 that includes the status "DONE". This is because the print process in accordance with the print data has already been finished. Moreover, when the print process in accordance with the print data PD1 is finished, the controller 20 of the printer 10 provides information indicating that the printing has finished to the storage administration server 50. In this case, the storage administration server 50 changes the status included in the job information J1 from "QUEUED" to "DONE".

(Processes Executed by Printer 10)

Figure 4:
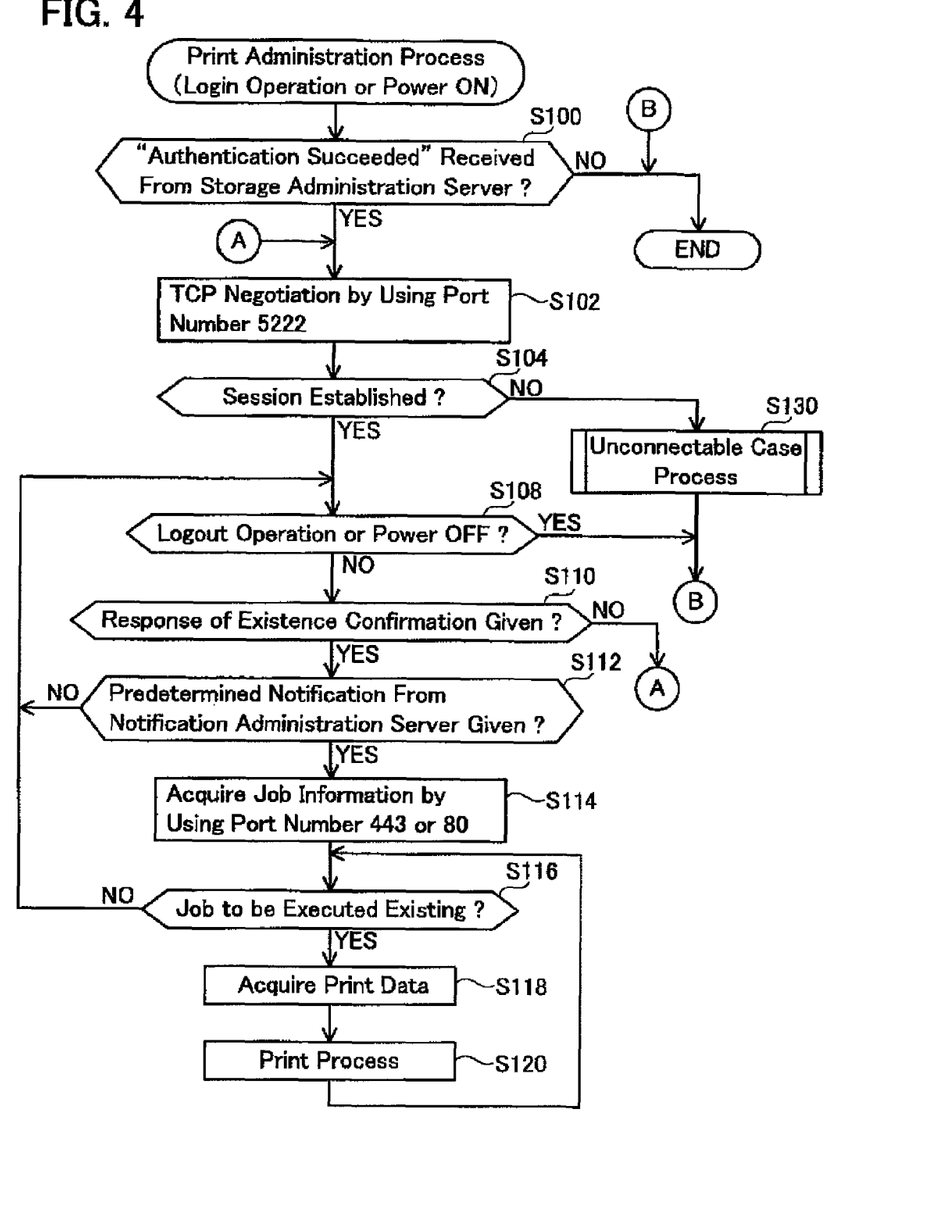
FIG. 4 shows a flow chart of a print administration process.

Next, contents of processes executed by the printer 10 will be described in detail with reference to FIG. 4. The respective processes in the sequence diagram shown in FIG. 2 are realized as a result of the printer 10 executing a print administration process shown in FIG. 4. The print administration process shown in FIG. 4 is started when the login is made from the PC 80 (that is, when the login information (user ID and password) is acquired from the PC 80) or when power of the printer 10 is turned on.

In S100, the second communication executing unit 34 transmits the login information to the storage administration server 50 and judges whether or not the success information indicating that the authentication has succeeded is to be received from the storage administration server 50. Moreover, in the process of S100 that is executed when the login is made from the PC 80, the login information acquired upon the login is transmitted to the storage administration server 50. On the other hand, in the process of S100 that is executed when the power of the printer 10 is turned on, the login information already acquired from the PC 80 prior the power of the printer 10 being turning off is transmitted to the storage administration server 50. However, in a case where the power of the printer 10 is turned off in a state in which the printer 10 is logged out from the PC 80, the login information is not transmitted to the storage administration server 50 when the power of the printer 10 is turned on. In this case, a judgment of NO is made in S100 and the print administration process is terminated.

Moreover, in a case where success information (as well as the AuthToken "AT1") is received from the storage administration server 50 (in a case of YES in S100), in S102, the judging unit 30 executes the TCP negotiation using the port number 5222. Next, in S104, the judging unit 30 judges whether or not the communication session has been established.

As above mentioned, the continuous communication session is established by the communication using the port number "5222". In the case where the continuous communication session is being established, an attack using the communication session may be launched from outside of the LAN 4. Therefore, in order to tighten security, an administrator of the LAN 4 may possibly prohibit the communication using the port number "5222". For example, the administrator can instruct a router between the LAN 4 and the Internet 6 to discard packets using the port number "5222" (so as to prevent the packets from passing). In this case, even if the judging unit 30 transmits the SYN signal using the port number "5222", since the SYN signal is discarded, the judging unit 30 is unable to receive the SYN/ACK signal from the notification administration server 60 and, as a result, the TCP negotiation does not succeed (the continuous communication session is not established).

In a case where the SYN/ACK signal cannot be received from the notification administration server 60 (the case where the continuous communication session is not established), the judging unit 30 judges that the communication using the port number "5222" is not executable (makes a judgment of NO in S104) and proceeds to S130. On the other hand, in a case where the SYN/ACK signal can be received from the notification administration server 60 (the case where the continuous communication session is established), the judging unit 30 judges that the communication using the port number "5222" is executable (makes a judgment of YES in S104) and proceeds to S108. As shown, depending on whether or not the continuous communication session is established, the printer 10 is capable of appropriately judging whether or not the communication using the port number "5222" is executable.

Moreover, in a case of YES in S104, the first communication executing unit 32 maintains the continuous communication session. That is, the first communication executing unit 32 maintains the status in which the XMPP stream is being opened.

In S108, the controller 20 monitors an execution of a logout from the PC 80 and an operation of a software switch for turning off the power of the printer 10. In a case of YES in S108, the controller 20 terminates the print administration process.

On the other hand, in a case of NO in S108, in S110, the first communication executing unit 32 executes an existence confirmation of the notification administration server 60 by using the continuous communication session. Specifically, the first communication executing unit 32 transmits a confirmation signal to the notification administration server 60 by using the continuous communication session and judges whether a response signal from the notification administration server 60 is received or not.

For example, in a case where the notification administration server 60 is down, the response signal is not received from the notification administration server 60. In this case, the first communication executing unit 32 makes a judgment of NO in S110 and proceeds to S102. Accordingly, while processes of S102 and S104 are executed once again, since the notification administration server 60 is down, the judgment of NO is made in S104 and the process proceeds to S130.

On the other hand, in a case where the response signal is received from the notification administration server 60 (in a case of YES in S110), in S112, the first communication executing unit 32 judges whether or not a predetermined notification (that is, the XMPP notification; refer to FIG. 2) has been received from the notification administration server 60. In a case where the predetermined notification has not been received from the notification administration server 60 (in a case of NO in S112), the process returns to S108.

In a case where the predetermined notification is received from the notification administration server 60 (in a case of YES in S112), in S114, the second communication executing unit 34 establishes the temporary communication session between the printer 10 and the storage administration server 50 by using the port number "443". Subsequently, in S114, the second communication executing unit 34 provides request information including the AuthToken "AT1" to the storage administration server 50 by the communication using the temporary communication session, which in other words, by the communication using the port number "443". Accordingly, the second communication executing unit 34 acquires the job information (for example, the job information J1 and J2 shown in FIGS. 2 and 3) from the storage administration server 50.

Moreover, in S114, when the second communication executing unit 34 is unable to establish the temporary communication session by using the port number "443", the second communication executing unit 34 establishes the temporary communication session by using a port number "80". Subsequently, the second communication executing unit 34 acquires job information from the storage administration server 50 by the communication using the port number "80". Normally, the port number "80" is a port number used in HTTP (HyperText Transfer Protocol) communication. That is, generally, in a case where a second type of communication using a second port number (for example, the port number "443") is not executable, the second communication executing unit 34 may acquire specific address information by executing a third type of communication using a third port number (for example, the port number "80") that differs from the first and second port numbers.

Next, in S116, the data acquiring unit 36 judges whether or not a job to be executed by the printer 10 exists. Specifically, the data acquiring unit 36 judges whether or not job information including the printer ID of the printer 10 and the status "QUEUED" (for example, the job information J1 in FIG. 3) exists among the job information acquired from the storage administration server 50. Moreover, in a case where not even one job information is acquired from the storage administration server 50 despite the request information including the AuthToken "AT1" being provided in S114, a judgment of NO is made in S116 and the process returns to S108.

As above mentioned, the storage administration server 50 administrates the job information for each user ID. Therefore, for example, if the user of the PC 80 issues an instruction for causing the printer 10 to execute printing and an instruction for causing a printer other than the printer 10 to execute printing to the storage administration server 50, first job information in accordance with the former instruction and second job information in accordance with the latter instruction are stored in association with the user ID of the user. The first job information includes the printer ID of the printer 10 but the second job information includes a printer ID of a different printer. In this case, in S116, the data acquiring unit 36 judges that the first job information represents a job to be executed by the printer 10 and judges that the second job information represents a job not to be executed by the printer 10. According to this configuration, the printer 10 is capable of appropriately judging a job to be executed by the printer 10 itself based on the printer ID included in the job information.

In addition, in S116, the data acquiring unit 36 judges that job information including the status "QUEUED" represents a job to be executed by the printer 10 and judges that job information (for example, the job information J2 shown in FIG. 3) including a status other than the status "QUEUED" (for example, "DONE" or "ERROR") represents a job not to be executed by the printer 10. According to this configuration, the printer 10 is capable of acquiring print data and appropriately judging whether or not printing is to be executed depending on a status of the print data.

In a case where the job to be executed by the printer 10 (for example, the job information J1 shown in FIGS. 2 and 3) exists (in a case of YES in S116), in S118, the data acquiring unit 36 acquires print data from the storage unit 56 by using the URL of the print data (for example, the print data PD1 shown in FIG. 2) included in the job information. Next, in S120, the print control unit 38 causes the print executing unit 16 to execute printing of the image represented by the print data.

After S120 is concluded, the process returns to S116 and the data acquiring unit 36 judges whether or not another job to be executed by the printer 10 exists. Supposing that both job information J1 and J2 acquired in S114 include the status "QUEUED", after S118 and S120 are executed according to the job information J1, in S116, the data acquiring unit 36 makes a judgment of YES regarding the job information J2. In this case, in S118, the data acquiring unit 36 acquires the print data from the storage unit 56 by using a URL of print data included in the job information J2, and in S120, the print control unit 38 causes the print executing unit 16 to execute printing of the image represented by the print data. According to this configuration, when URLs of a plurality of print data are acquired, the printer 10 is capable of appropriately executing printing according to the plurality of print data.

Figure 5:
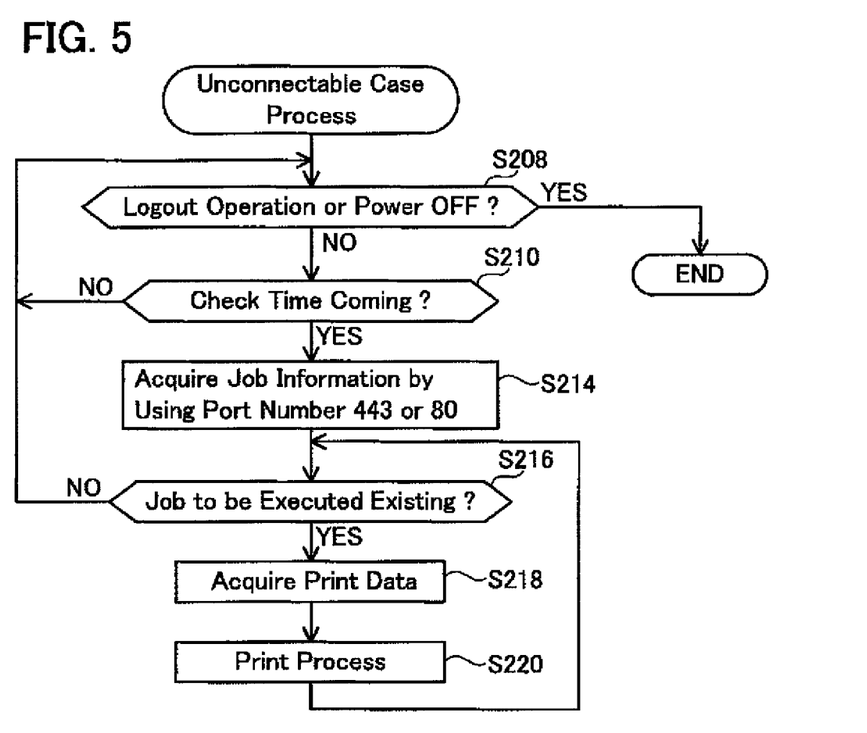
FIG. 5 shows a flow chart of an unconnectable case process.

(Unconnectable Case Process: FIG. 5)

Next, contents of an unconnectable case process executed in S130 in FIG. 4 will be described. The unconnectable case process is executed in a case where, in S104, the communication using the port number "5222" is judged to be not executable (in a case where a continuous communication session is not established).

As shown in FIG. 5, in S208, the controller 20 monitors an execution of a logout from the PC 80 and an operation of a software switch for turning off the power of the printer 10. In a case of YES in S208, the controller 20 ends the unconnectable case process shown in FIG. 5 and, as a result, the print administration process shown in FIG. 4 ends.

On the other hand, in a case of YES in S208, in S210, the second communication executing unit 34 judges whether or not a present time has passed a predetermined check time. Moreover, for example, the check time is a time after a predetermined period of time has lapsed from a previous execution of the process of S214.

In a case where the present time has passed the check time (in a case of YES in S210), in S214, the second communication executing unit 34 executes a similar process as S114 in FIG. 4 and acquires job information. Next, in S216 and S218, the data acquiring unit 36 executes similar processes as in S116 and S118 in FIG. 4, and in S220, the print control unit 38 executes a similar process as in S120 in FIG. 4.

Moreover, as is apparent from the flow chart in FIG. 5, the unconnectable case process shown in FIG. 5 continues until the judgment of YES is made in S208. Therefore, each time the judgment of YES is made in S210, in S214, the second communication executing unit 34 executes communication using the port number "443". That is, the second communication executing unit 34 repeatedly executes the communication using the port number "443". As a result, even if the predetermined notification is not received, the printer 10 is capable of appropriately receiving the job information after the print data is stored in the storage unit 56. Moreover, in the present embodiment, while the second communication executing unit 34 repeatedly executes the communication using the port number "443" on a regular basis, in a modification, the second communication executing unit 34 may repeatedly execute the communication using the port number "443" on an irregular basis. In addition, in order to reduce the time from storage of print data in the storage unit 56 to execution of printing by the printer 10 (in other words, a latency time of the user), intervals of the repeatedly-executed process of S214 are favorably reduced.

(Advantageous Effect of Present Embodiment)

By utilizing the communication system 2 according to the present embodiment, even if the PC 80 does not comprise a printer driver for causing the printer 10 to execute the printing, the PC 80 is capable of issuing the instruction (the printer name PN1, the print data PD1) for causing the printer 10 to execute the printing to the storage administration server 50 by using the web browser. In addition, in a case where the predetermined notification is received from the notification administration server 60, the printer 10 is capable of executing the printing in accordance with the print data PD1. That is, in the present embodiment, even if the PC 80 does not comprise the printer driver, the PC 80 is capable of causing the printer 10 to execute the printing by using the print mediation server (the storage administration server 50 and the notification administration server 60). That is, the PC 80 is capable of utilizing the cloud printing service.

According to the present embodiment, the printer 10 judges whether the communication using the port number "5222" is executable or not (S104 in FIG. 4). When it is judged that the communication using the port number "5222" is executable (in a case of YES in S104), the printer 10 executes the communication using the port number "5222" to receive the predetermined notification (YES in S112) and, as a result, executes the communication using the port number "443" to acquire job information (S114). As above mentioned, the administrator of the LAN 4 may possibly prohibit the communication using the port number "5222". In this case, the printer 10 cannot execute the communication using the port number "5222" to receive the predetermined notification. However, when it is judged that the communication using the port number "5222" is not executable (in a case of NO in S104), even if the predetermined notification is not received, the printer 10 executes the communication using the port number "443" at the predetermined timing to acquire the job information (S214 in FIG. 5). That is, according to the present embodiment, the printer 10 is capable of appropriately acquiring the job information in both the state in which the communication using the port number "5222" is executable and the state in which the communication using the port number "5222" is not executable. Therefore, the printer 10 is capable of acquiring the specific print data by using the URL of the print data included in the job information and appropriately executing the printing thereof.

Furthermore, in the present embodiment, in the case where the continuous communication session is established (in a case of YES in S104 in FIG. 4), the printer 10 executes the following operations. That is, in the case where the status in which the continuous communication session is being established is maintained until the predetermined notification is received, the printer 10 executes the communication using the port number "443" upon receiving the predetermined notification to acquire the job information from the storage administration server 50 (S114). However, in the case where the status in which the continuous communication session is being established is not maintained until the predetermined notification is received (NO in S110), the printer 10 executes the unconnectable case process of S130. That is, even if the predetermined notification is not received, the printer 10 executes the communication using the port number "443" to acquire the job information from the storage administration server 50 (S214 in FIG. 5). According to this configuration, even if a transition is made from the state in which the communication using the port number "5222" is executable to the state in which the communication using the port number "5222" is not executable (for example, even if the notification administration server 60 is down), the printer 10 is capable of appropriately acquiring the job information.

(Correspondence Relationship)

The port number "5222" and the port number "443" are, respectively, examples of "first port number" and "second port number". Therefore, communication using the port number "5222" and communication using the port number "443" are, respectively, examples of "first type of communication" and "second type of communication". The print data PD1 is an example of "specific print data", and the URL of the print data PD1 is an example of "specific address information". The user ID "U1" and the AuthToken "AT1" are, respectively, examples of "specific account information" and "relative information".

(Modification 1) The servers 50 and 60 need not be configured separately as in the embodiment described above and may alternatively be configured integrally. Generally, "print mediation server" may be realized by a single device or by a plurality of devices.

(Modification 2) The storage administration server 50 need not register the AuthToken to the printer administration table 52 in association with the user ID. In this case, in S114 in FIG. 4 or S214 in FIG. 5, the second communication executing unit 34 may provided the user ID "U1" to the storage administration server 50 and acquire job information. In the present modification, the user ID "UV" is both an example of "specific account information" and an example of "relative information". In other words, generally, "relative information" may be information that differs from "specific account information" as in the case of the embodiment described above, or may be the same information as "specific account information" as in the case of the present modification. Moreover, "specific account information" is not limited to a user ID and may alternatively be an account name, a user name, a login name, or the like.

(Modification 3) In the embodiment described above, in S102 and S104 in FIG. 4, the judging unit 30 attempts to establish the continuous communication session to judge whether the communication using the port number "5222" is executable or not. Alternatively, for example, the administrator of the LAN 4 may check in advance whether the communication using the port number "5222" is executable or not, and cause the printer 10 to store the findings. In this case, the judging unit 30 may judge whether the communication using the port number "5222" is executable or not based on the findings.

(Modification 4) In the embodiment described above, the PC 80 accesses the storage administration server 50 by using the web browser and transmits the print data PD1 and the like to the storage administration server 50 (refer to FIG. 2). Alternatively, the PC 80 may transmit the print data PD1 and the like to the storage administration server 50 by using a dedicated program for accessing the storage administration server 50 (instead of the web browser, for example, a program prepared by a provider of the storage administration server 50 or a program provided by the vendor of the printer 10).

(Modification 5) "printer" need not be limited to a device comprising only a print function and may alternatively be a device comprising another function (a scan function, a copy function, a FAX function, a phone function, and the like). In other words, the term "printer" encompasses a copying machine, a FAX machine, a multi-function device (a device at least comprising a print function and another function), and the like.

(Modification 6) The term "terminal device" is not limited to a PC and encompasses a mobile phone, a PDA, a scanner, a multi-function device, and the like.

(Modification 7) In the foregoing embodiment, the judging unit 30, the first communication executing unit 32, the second communication executing unit 34, the data acquiring unit 36, and the print control unit 38 are realized as a result of the controller 20 executing the processes according to the program in the memory 24. Nevertheless, at least one unit of respective units 30 to 38 may alternately be realized by a hardware resource such as a logic circuit.

What is claimed is:

1. A printer configured to be connected with a print mediation server through the Internet, the printer comprising:
 a processor configured to operate as:
 a judging unit configured to judge whether a first type of communication using a first port number is executable or not with the print mediation server;
 a first communication executing unit configured to execute the first type of communication so as to receive a predetermined notification from the print mediation server in a case where it is judged that the first type of communication is executable, wherein the predetermined notification is a notification to be sent to the printer by the print mediation server when the print mediation server has stored specific print data in a storage unit according to an instruction from a terminal device;
 a second communication executing unit configured to:
 (A) execute, when the predetermined notification is received, a second type of communication using a second port number different from the first port number with the print mediation server so as to acquire specific address information indicating a storage address of the specific print data in the storage unit from the print mediation server, in the case where it is judged that the first type of communication is executable; and
 (B) execute, even if the predetermined notification is not received, the second type of communication at a predetermined timing so as to acquire the specific address information from the print mediation server, in a case where it is judged that the first type of communication is not executable;
 a data acquiring unit configured to acquire the specific print data from the storage unit by using the specific address information; and
 a print control unit configured to cause a print executing unit to execute printing of an image represented by the specific print data.

2. The printer as in claim 1, wherein
 the second communication executing unit is configured to repeatedly execute, even if the predetermined notification is not received, the second type of communication, in the case where it is judged that the first type of communication is not executable.

3. The printer as in claims 1, wherein
the judging unit is configured to:
attempt establishing a communication session between the printer and the print mediation server by using the first port number;
judge that the first communication is executable in a case where the communication session is established by the attempting; and
judge that the first communication is not executable in a case where the communication session is not established by the attempting.

4. The printer as in claim 3, wherein
the first communication executing unit is configured to maintain a status in which the communication session is being established in the case where the communication session is established by the attempting.

5. The printer as in claim 4, wherein
the second communication executing unit is configured to:
(A1) execute, when the predetermined notification is received, the second type of communication so as to acquire the specific address information from the print mediation server, in the case where the communication session is established by the attempting and in a case where the status in which the communication session is being established has been maintained until receiving the predetermined notification; and
(A2) execute, even if the predetermined notification is not received, the second type of communication at the predetermined timing so as to acquire the specific address information from the print mediation server, in the case where the communication session is established by the attempting and in a case where the status in which the communication session is being established has not been maintained until receiving the predetermined notification.

6. The printer as in claim 1, wherein
the print mediation server is configured to store an association of specific account information and the specific address information, and
the second communication executing unit is configured to provide, in the second type of communication, relative information related to the specific account information to the print mediation server so as to acquire the specific address information associated with the specific account information from the print mediation server.

7. The printer as in claim 6, wherein
the print mediation server is configured to store an association of the specific account information and a plurality of address information including the specific address information,
the second communication executing unit is configured to provide, in the second type of communication, the relative information related to the specific account information to the print mediation server so as to acquire the plurality of address information associated with the specific account information from the print mediation server,
the data acquiring unit is configured to, for each of the plurality of address information, acquire print data from the storage unit by using the address information, and
the print control unit is configured to, for each of a plurality of print data acquired by using the plurality of address information, cause the print executing unit to execute printing of an image represented by the print data.

8. The printer as in claim 1, wherein
the second communication executing unit is configured to acquire, in the second type of communication, status information related to a status of the specific print data along with the specific address information from the print mediation server,
the data acquiring unit is configured:
to acquire the specific print data from the storage unit according to the specific address information in a case where the status information indicates a status that the specific print data has not been acquired yet by the printer; and
not to acquire the specific print data in a case where the status information does not indicate the status that the specific print data has not been acquired yet by the printer.

9. The printer as in claim 1, wherein
the print mediation server includes:
a storage administration server configured to cause the storage unit to store the specific print data according to the instruction from the terminal device; and
a notification administration server configured to send the predetermined notification to the printer in a case where the notification administration server acquires from the storage administration server a storage notification indicating that the storage administration server has caused the storage unit to store the specific print data,
the first communication executing unit is configured to execute the first type of communication with the notification administration server so as to receive the predetermined notification from the notification administration server, and
the second communication executing unit is configured to execute the second type of communication with the storage administration server so as to acquire the specific address information from the storage administration server.

10. A printer configured to be connected with a print mediation server through the Internet, the printer comprising:
a judging unit configured to judge whether a first type of communication using a first port number is executable or not with the print mediation server,
a first communication executing unit configured to execute the first type of communication so as to receive a predetermined notification from the print mediation server in a case where it is judged that the first type of communication is executable, wherein the predetermined notification is a notification to be sent to the printer by the print mediation server when the print mediation server has stored specific print data in a storage unit according to an instruction from a terminal device;
a second communication executing unit configured to:
(A) execute, when the predetermined notification is received, a second type of communication using a second port number different from the first port number with the print mediation server so as to acquire specific address information indicating a storage address of the specific print data in the storage unit from the print mediation server, in the case where it is judged that the first type of communication is executable; and
(B) execute, even if the predetermined notification is not received, the second type of communication at a predetermined timing so as to acquire the specific address information from the print mediation server, in a case where it is judged that the first type of communication is not executable;

a data acquiring unit configured to acquire the specific print data from the storage unit by using the specific address information; and a print control unit configured to cause a print executing unit to execute printing of an image represented by the specific print data.

11. A non-transitory computer-readable storage medium storing a computer program for a printer configured to be connected with a print mediation server through the Internet, the computer program including instructions for causing a processor of the printer to execute:

judging whether a first type of communication using a first port number is executable or not with the print mediation server;

executing the first type of communication so as to receive a predetermined notification from the print mediation server in a case where it is judged that the first type of communication is executable, wherein the predetermined notification is a notification to be sent to the printer by the print mediation server when the print mediation server has stored specific print data in a storage unit according to an instruction from a terminal device;

executing, when the predetermined notification is received, a second type of communication using a second port number different from the first port number with the print mediation server so as to acquire specific address information indicating a storage address of the specific print data in the storage unit from the print mediation server, in the case where it is judged that the first type of communication is executable;

executing, even if the predetermined notification is not received, the second type of communication at a predetermined timing so as to acquire the specific address information from the print mediation server, in a case where it is judged that the first type of communication is not executable;

acquiring the specific print data from the storage unit by using the specific address information; and causing a print executing unit to execute printing of an image represented by the specific print data.

* * * * *